(12) United States Patent
Busson et al.

(10) Patent No.: US 7,662,866 B2
(45) Date of Patent: Feb. 16, 2010

(54) POLYMERIC SUPPORT HAVING NOVEL PORE STRUCTURES

(75) Inventors: Philippe Busson, Uppsala (SE); Ronnie Palmgren, Uppsala (SE); Michael Morrison, Solna (SE)

(73) Assignee: GE Healthcare Bio-Sciences AB, Uppsala (SE)

( * ) Notice: Subject to any disclaimer, the term of this patent is extended or adjusted under 35 U.S.C. 154(b) by 995 days.

(21) Appl. No.: 10/517,226

(22) PCT Filed: Jun. 17, 2003

(86) PCT No.: PCT/SE03/01017

§ 371 (c)(1),
(2), (4) Date: Dec. 7, 2004

(87) PCT Pub. No.: WO2004/003043

PCT Pub. Date: Jan. 8, 2004

(65) Prior Publication Data

US 2005/0245624 A1   Nov. 3, 2005

(30) Foreign Application Priority Data

Jun. 27, 2002 (SE) .................................... 0202016

(51) Int. Cl.
*C08J 9/26* (2006.01)
(52) U.S. Cl. ................... 521/61; 521/60; 521/149; 521/150; 521/134; 521/140
(58) Field of Classification Search ............... 521/61, 521/601, 60, 149, 150, 140
See application file for complete search history.

(56) References Cited

U.S. PATENT DOCUMENTS 5,288,763 A * 2/1994 Li et al. ........................ 521/61
5,763,548 A * 6/1998 Matyjaszewski et al. .... 526/135
5,900,146 A   5/1999 Ballard et al.
6,121,371 A   9/2000 Matyjaszewski et al.
6,458,903 B1  10/2002 Nakagawa et al.

FOREIGN PATENT DOCUMENTS

EP   0 222 718      5/1987
JP   11-147915      6/1999
WO   WO 99/50310   10/1999

OTHER PUBLICATIONS

, Fujimori et al Effect of viscosity . . . , Pol. Bull, 9, 204-207(1983).*
Ali, M., et al., "Mechanism of Capsule Formation by Suspension Atom Transfer Radical Polymerization", *Polymer Preprints*, vol. 43, No. 2, 2002, p. 59-60.
De Clercq, B., et al., "Atom Transfer Radical Polymerization of Vinyl Monomers Mediated by Schiff Base Ruthenium-Alkylidene Catalysts and the Adventitious Effect of Water in Polymerizations with the Analogous Cationic Complexes", *Macromolecules*, vol. 35, 2002, p. 8943-8947.
Carlmark, A., et al., "Atom transfer radical polymerization of methyl acrylate from a multifunctional initiator at ambient temperature", *Polymer*, vol. 43, 2002, p. 4237- 4242.

* cited by examiner

*Primary Examiner*—James Seidleck
*Assistant Examiner*—Gregory Listvoyb
(74) *Attorney, Agent, or Firm*—Yonggang Ji

(57) ABSTRACT

The invention is a method of producing a cross-linked polymeric support having a multimodal pore structure, which comprises providing a degradable initiator molecule; providing an organic phase comprising said initiator molecule, radically polymerizable monomers and a porogen in a solvent; providing an aqueous phase comprising a transition metal catalyst; suspension polymerization of the organic phase by adding a ligand, co-ordinating to the transition metal in the aqueous phase to produce a cross-linked polymeric support having a primary pore structure and comprising initiator molecule; and subjecting the support obtained to degrading conditions to remove the initiator molecule from within the support to produce a cross-linked polymeric support having a secondary pore structure in addition to the primary pore structure.

19 Claims, 11 Drawing Sheets

Figure 10.

Table 1: Polydivinylbenzene beads initiated by Boltorn®-BiB macroinitiators and mediated by CuCl/PMDETA

| Beads | Boltorn®-BiB Generation | Mass (g) | DVB (g) | Porogen Toluene (ml) | Porogen 2-Ethyl-1-hexanol (ml) | Yield (%) | Before hydrolysis Surface area (m² g⁻¹) | Before hydrolysis Adsorption pore volume (ml g⁻¹) |
|---|---|---|---|---|---|---|---|---|
| A1[a] | 2nd | 0.33 | 0.60 | 0.33 | 0.66 | 86 | 134 | 0.3742 |
| A2[b] | 2nd | 0.15 | 0.27 | 0.22 | 0.45 | 82 | 65 | 0.1872 |
| A3[b] | 2nd | 0.30 | 0.27 | 0.30 | 0.30 | 79 | 1 | 0.0067 |
| A4[c] | 3rd | 2.11 | 4.48 | 2.10 | 4.90 | 82 | 117 | 0.3354 |
| A5[c] | 3rd | 1.53 | 3.26 | 1.99 | 4.64 | 81 | 73 | 0.1833 |
| A6[d] | 4th | 0.17 | 0.37 | 0.17 | 0.40 | 94 | 64 | 0.1547 |
| A7[e] | 4th | 0.75 | 1.60 | 0.97 | 2.27 | 91 | 140 | 0.3210 |

[a]Sealed test tube reactor, 12 ml; 9 ml Mowiol (5%), 0.03 ml HCl (37%), 0.18 ml PMDETA, 0.044 g CuCl
[b]Sealed test tube reactor, 5 ml; 3 ml Mowiol (5%), 0.03 ml HCl (37%), 0.092 ml PMDETA, 0.022 g CuCl
[c]Sealed test tube reactor, 50 ml; 36 ml Mowiol (5%), 0.21 ml HCl (37%), 1 ml PMDETA, 0.22 g CuCl
[d]Sealed test tube reactor, 5 ml; 3 ml Mowiol (2%), 0.03 ml HCl (37%), 0.092 ml PMDETA, 0.022 g CuCl
[e]Sealed test tube reactor, 25 ml; 16 ml Mowiol (2%), 0.13 ml HCl (37%), 0.46 ml PMDETA, 0.11 g CuCl

Figure 11.

Table 2: Hydrolytic degradation of the polyester portion of poly(Boltorn®-BiB-divinylbenzene) beads

| Beads | Boltorn®-BiB | | Wt% DVB | Amount of initiation sites in feed (mmol g$^{-1}$) | After hydrolysis | | | | |
|---|---|---|---|---|---|---|---|---|---|
| | Generation | Wt% | | | % Retention of resin[a] | Carboxylic acid group capacity (mmol g$^{-1}$)[b] | % Conversion of initiation sites[c] | Surface area (m$^2$ g$^{-1}$) | Adsorption pore volume (ml g$^{-1}$) |
| B1 | 2$^{nd}$ | 35.4 | 64.6 | 1.37 | 66.7 | 0.56 | 27 | 281 | 0.4955 |
| B2 | 2$^{nd}$ | 35.4 | 64.6 | 1.37 | 69.8 | 1.35 | 69 | 142 | N/A |
| B3 | 2$^{nd}$ | 52.2 | 47.8 | 2.02 | 57.4 | 0.80 | 23 | 90 | 0.0731 |
| B4 | 3$^{rd}$ | 32.0 | 68.0 | 1.22 | 72.6 | 0.86 | 51 | 199 | 0.4943 |
| B5 | 3$^{rd}$ | 31.9 | 68.1 | 1.22 | 80.6 | 0.84 | 56 | 245 | 0.2997 |
| B6 | 4$^{th}$ | 31.9 | 68.1 | 1.21 | 71.4 | 0.78 | 46 | 171 | 0.3448 |
| B7 | 4$^{th}$ | 31.9 | 68.1 | 1.21 | 79.1 | 0.56 | 36 | 291 | 0.4249 |

[a] Determined by gravimetry
[b] Determined by titration
[c] Calculated as, (carboxylic acid group capacity/ retention of resin)/ amount of initiation sites in feed

POLYMERIC SUPPORT HAVING NOVEL PORE STRUCTURES

CROSS REFERENCE TO RELATED APPLICATIONS

This application is a filing under 35 U.S.C. § 371 and claims priority to international patent application number PCT/SE2003/001017 filed June 17, 2003, published on January 8, 2004 as WO 2004/003043 and also claims priority to patent application number 0202016-2 filed in Sweden on Jun. 27, 2002; the disclosures of which are incorporated herein by reference in their entireties.

TECHNICAL FIELD

The present invention relates to the preparation of cross-linked polymeric supports that are useful e.g. in separation methods, and more specifically to a method of producing a cross-linked polymeric support useful as a chromatographic matrix, which support exhibits a novel pore structure. The invention also encompasses porous cross-linked poly-meric supports as such as well as a method of modifying such supports with functional groups useful as ligands in chromatography.

BACKGROUND

Cross-linked, porous polymeric supports, such as particles, are useful as adsorbents in methods for separation and purification of organic and inorganic materials, such as in chromatographic separation and filtration methods. Further applications of such supports are e.g. as microcarriers for cell culture and as supports for solid-phase peptide or DNA synthesis. The supports should be chemically compatible to organic solvents over a wide range of pH and should have a desired shape, size, and porosity and surface area.

The porosity, and the nature of the pores, are properties that have been shown to be of specific importance in chromatographic methods for purification of target molecules, since an increased porosity will result in an increased surface area and accordingly a potentially increased binding capacity.

Furthermore, a general problem in chromatography, adsorption processes, heterogeneous catalysis etc where porous particles are used, is that the mass transport rate is strongly dependent on the particle size. Rapid mass transport can be achieved by decreasing the particle size, but small particles will also increase the backpressure of the packed beds. Hence, a trade-off must be made between the mass transport rate and the pressure-flow properties. One way to improve the mass transport in a porous particle is to increase the total pore surface. Hierarchical pore structures have for example been suggested, wherein large feeder pores from the particle surface open into a network of smaller pores with a large surface available for adsorption.

One way of providing such a pore system has been disclosed by EP 0 222 718 (Mosbach and Nilsson), which suggests to solve the above-discussed mass transport problem by introducing cavities in their particles. More specifically, EP 0 222 718 discloses a method, wherein a solid cavity-generating compound is added to an aqueous solution comprising a matrix material, emulsifier is added, particles are formed by dispersion and finally said cavity-generating compound is leached out to leave behind cavities in the particles. An illustrative cavity-generating compound is calcium carbonate, and an illustrative added amount thereof is up to 10% by weight, corresponding to 3.6% by volume. However, at such low amounts of cavity-forming compound, the pores will not make contact with each other, resulting in a closed-cell porous structure.

A specific technology for creating very small cavities in a polymer particle using a removable target compound is known as molecular imprinting. As the name implies, molecules are used as targets and are more specifically coupled to a polymeric chain via hydrogen bonding. The molecules used are for example drug targets, such as alkaloids, and the cavity left can be described as an imprint of the used target molecule and is accordingly limited to isolation of that same molecule kind. Moreover, molecular imprinting is limited to applications wherein microdimensional pore systems are desired.

U.S. Pat. No. 5,895,263 (Carter et al) discloses how materials degradable by heating can be used in a process for forming an integrated circuit device. Porous organic polysilica, which is a dielectric material, is first dissolved in a solution of a decomposable polymer. The mixture obtained is heated in order to condense the organic polysilica. Finally, the decomposable polymer is decomposed uniformly, e.g. by exposure to radiation, within the matrix of the condensed rigid organic polysilica. The product obtained has improved mechanical toughness, crack resistance and dielectric properties. Consequently, the product can also be used as a protective coating for optical articles, such as glasses, contact lenses and solar reflectors.

WO 01/09204 (Symyx Technologies) discloses a method of producing controlled-architecture polymers. More specifically, the disclosed architectured polymers are comprised of polyacrylamide repeating units having properties that are advantageous in electrophoretic separation systems, since the sieving capability of the partially branched or cross-linked polymer will be enhanced as compared to linear non-cross-linked polymers having the same repeating unit. However, sieving is not an essential property for polymer supports intended for use as chromatographic matrices, since other properties such as the above-discussed available surface area and mass transport are then of much greater importance. The method utilises living-type or semi-living type free radical polymerisation.

At the moment, free radical suspension polymerisation is the most widely used technique in the preparation of synthetic polymer supports for heterogeneous catalysts, ion exchange resins, chromatography media, peptide synthesis etc. Pore structures are then mainly provided by incorporation of a porogen and/or control of the level of cross-linking in the resin.

Atom transfer radical polymerisation (ATRP), which is a metal/ligand catalysed polymerisation, has offered a relatively new perspective on the synthesis of polymeric resins. One of the advantages with ATRP is that it provides a high degree of control over the polymerisation process. U.S. Pat. No. 5,763,548 (Matyjaszewsk et al) describes in detail conditions and components used in an ATRP process for preparing plastics, elastomers, adhesives, emulsifiers, or thermoplastic elastomers.

SUMMARY OF THE PRESENT INVENTION

One object of the present invention is to provide a method of producing cross-linked polymeric supports of multimodal pore structures. This can be achieved by a method as defined in claim 1 and the claims dependent thereon.

Another object of the invention is to provide a method of producing porous cross-linked polymeric supports, which enables the definition of the morphology of the supports produced. This can be achieved by use of a method as described above, wherein the amount and/or nature of initiator molecule is carefully controlled. Alternatively or additionally, this can be achieved by controlling the composition of the monomer feed to the polymerisation process.

A further object of the present invention is to provide porous cross-linked polymeric supports with pendant functionalities.

Yet another object of the invention is to provide porous cross-linked polymeric supports that have different functionalities on the support surface, in the primary pore system and on the surface within the larger secondary pore system.

Further embodiments and advantages of the present invention will appear from the detailed description and the experimental part below.

BRIEF DESCRIPTION OF DRAWINGS

FIG. 10 shows Table 1, naming polydivinylbenzene beads initiated by Boltorn®-BiB macroinitiators and mediated by CuCl/PMDETA.

FIG. 11 shows Table 2, illustrating the hydrolytic degradation of the polyester portion of poly(Boltorn®-BiB-divinylbenzene) beads.

DEFINITIONS

Figure 1:
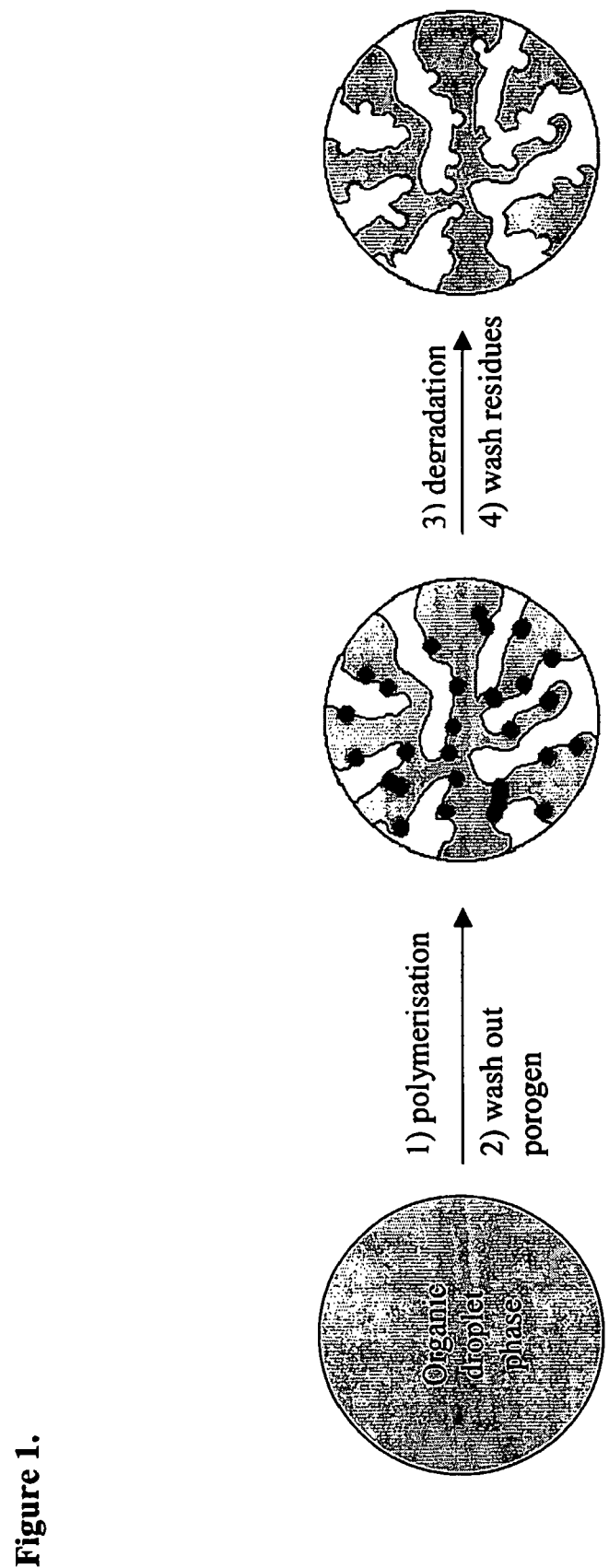
FIG. 1 illustrates how an organic droplet phase is polymerised by suspension polymerisation and subsequently transformed into a polymer particle comprising a secondary pore structure in accordance with the present invention.

The term "initiator molecule" means herein an organic compound that comprises at least one site from which a radical polymerisation can be initiated. The term includes initiator molecules of different sizes, such as lower molecular compounds, including dimers, trimers and oligomers, and macromolecules. The term "multi-initiator" is used herein for an initiator molecule that comprises two or more initiator sites.

The term "macroinitiator" means herein an initiator molecule, which is a macromolecule and which comprises at least one initiating site.

The term "macromolecule" means herein a molecule that comprises a large number of monomeric units and has a number average molecular weight ($M_n$) of at least about 500.

The term "degradable" means in the present context that it is possible to remove by chemical or physical degradation thereof.

The term "multimodal" pore structure means a structure that can be created in two or more modes, such as pore systems of differing sizes and/or pore systems created at different times.

The term "support" as used herein means a matrix suitable for use as a carrier of functional groups in an isolation process, such as a chromatographic procedure. The term "support" includes particles, monoliths and membranes.

The term "dendritic" compound is used in its conventional meaning to denote an isotropically soluble polymer that exhibits a tree-like structure.

The term "porogen" refers to an inert solvent (low molecular weight or polymeric), or a mixture of inert solvents, which is present during a polymerisation reaction wherein it gives rise to formation of a porous polymer at some stage during the polymerisation.

DETAILED DESCRIPTION OF THE INVENTION

A first object of the present invention is a method of producing a cross-linked polymeric support having a multimodal pore structure, which method comprises the steps of
  (a) providing a degradable initiator molecule;
  (b) providing an organic phase, which comprises said initiator molecule, one or more radically polymerisable monomers and a porogen in a solvent, and an aqueous phase, which comprises a transition metal catalyst;
  (c) forming a suspension of the organic phase and the aqueous phase;
  (d) starting a suspension polymerisation of the organic phase in the aqueous phase by adding a ligand, which co-ordinates to the transition metal in the aqueous phase via at least one atom, to produce a cross-linked polymeric support having a primary pore structure and comprising initiator molecule; and
  (e) subjecting the support obtained from step (d) to degrading conditions to at least partially remove the initiator molecule from within the support to produce a cross-linked polymeric support having a secondary pore structure in addition to the primary pore structure.

Thus, the present method uses the principles of atom transfer radical polymerisation (ATRP) in an otherwise conventional suspension polymerisation process. For a general description of ATRP, see e.g. Wang et al. (in J. Am. Chem. Soc., 1995, 36, 2973; and in Macromolecules, 1995, 28, 7572). In brief, in ATRP, the initiation system is based on the reversible formation of growing radicals in a redox reaction between various transition metal compounds and an initiator.

The present invention suggests for the first time to use atom transfer radical polymerisation in the production of polymeric supports that are porous. The multimodal pore structure including primary and secondary pores obtained according to the present method renders the supports especially useful as matrices in chromatographic methods.

In one embodiment of the present method, the initiator molecule provided in step (a) is obtained from commercial sources. For example, low molecular initiator molecules, such as 1-phenylethyl chloride or ethyl 2-bromoisobutyrate, are available e.g. from Acros or Aldrich. The initiator molecules can be inorganic or organic molecules, but are preferably organic compounds. In the present method, step (a) is understood to provide either one kind of initiator molecule or a mixture of two or more different initiator molecules.

In an alternative embodiment, step (a) comprises reacting a compound that has at least one hydroxy group, primary amine group or secondary amine group with an alfa-haloacyl halide. Thus, the reaction is either an esterification or an amidation performed according to conventional methods. An illustrative example of a suitable alfa-haloacyl halide is 2-bromoisobutyryl bromide (BiB), which is commercially available e.g. from Aldrich. More examples of alfa-haloacyl halides are e.g. 2-bromopropionyl bromide, 2-bromo-iso-valeryl bromide and 2-bromo-iso-butyryl chloride.

In one embodiment, the initiator molecule provided in step (a) is a macroinitiator. Macroinitiators useful in the present invention can have virtually any three-dimensional structures, such as a dendritic structure, including star-shaped and hyperbranched structures.

In an advantageous embodiment, the initiator molecule is synthesised by reacting a hydroxy-functional dendritic polyester with an alfa-haloacyl halide, resulting in a polyester macroinitiator. Hydroxy-functional polyesters are commercially available, e.g. Boltorn® from Perstorp Chemicals AB (Sweden), which is available in five generations and thus offers a convenient variety in size of the secondary pores created by their removal with little change in chemistry.

Dendritic polyesters useful as starting materials in the synthesis of a macroinitiator can also be prepared as described in WO 93/17060 (Hult et al) or WO 99/00440 (Ihre et al).

In an alternative embodiment, the initiator molecule is synthesised by reacting an amino-functional dendritic polyamide with an alfa-haloacyl halide, resulting in a polyamide macroinitiator. Amino-functional polyamides can for example be prepared as described in Tomalia et al (Angew. Chem. Int. Ed. Engl. 29, p. 138-175), describing the preparation of dendritic polyamide amines.

In one embodiment, the initiator molecule used in the present method can be prepared in the desired size by reacting a specified generation of a dendritic initiator molecule with an alfa-haloacyl halide. As mentioned above, some commercially available starting materials such as Boltorn® are available in several generations. Similarly, the synthesis of polyesters and/or amides can be performed in order to provide the desired generation of the dendritic molecule. Thus, one advantage with the present method is that by carefully selecting the size of the initiator molecule, the secondary pore size in the final product can be controlled. Thus, the novel kind of pores that is provided by removal of the initiator molecule can be defined by the size of the initiator molecule used. In addition, the novel pores can also consist of interlinks between the more conventional primary pores that originate from the porogen and/or monomer composition. Both the cavities formed where the initiator molecule is removed and the above-mentioned interlinks are part of the secondary pore structure, which is a kind of pore structure that cannot be achieved under conventional suspension polymerisation conditions.

Furthermore, even though the above-discussed U.S. Pat. No. 5,763,548 describes the principles of atom transfer radical polymerisation (ATRP), the conditions defined therein do not correspond to a conventional suspension polymerisation, such as the suspension polymerisation utilizedutilized according to the present invention. Furthermore, U.S. Pat. No. 5,763,548 describes ATRP for the preparation of solid articles, such as plastics, elastomers and the like, and nothing therein suggests that ATRP would be especially advantageous for the purpose of preparing porous polymeric supports. Accordingly, the present invention utilises for the first time the principles of ATRP with suspension polymerisation. In addition, the present invention combines such a polymerisation with the use of a degradable initiator molecule in order to provide a bimodal pore structure in the product.

The organic phase can be prepared in any suitable solvent, or mixture of solvents, conventionally used for suspension polymerisation, such as toluene, hexanone etc.

In one embodiment, the organic phase comprises up to 50%, such as about 30%, e.g. 32%, of initiator molecule, calculated as weight initiator molecule/weight main monomer. However, as the skilled person in this field will realise, the upper limit of the initiator molecule that can be provided in the organic phase will depend on the nature of the further components. For example, if a monomer feed that results in a more rigid polymer structure is used, then the proportion of initiator can be higher, the upper limit being determined by the risk of collapse of the final product. Accordingly, the intended use of the polymeric support produced will also be a factor to consider when the proportions of the components of the organic phase are decided.

The monomers present in the organic phase should provide for both polymerisation and cross-linking and the only requirement thereof is that they should be radically polymerisable. As is easily realised, in order to obtain a cross-linked product, at least one monomer present in the organic phase needs to be multifunctional. Thus, in one embodiment, the monomers are synthetic mono and/or multifunctional monomers, such as styrene and/or divinyl benzene.

In an advantageous embodiment, the organic phase also comprises one or more functional monomers, i.e. monomers that firstly comprise one vinyl group, which will be able to participate in the polymerisation, and secondly another functional group, which is not a vinyl group. Such a non-vinyl functional group can e.g. be a hydroxyl, an amine, or any other group that can subsequently be used for other purposes than forming the polymeric structure of the support. The skilled person who uses the method according to the invention can easily decide what kind of further functionalities that are needed for each intended purpose. One illustrative such further functionality is an easily accessible chemical handle for further derivatisation of supports intended for use as chromatographic matrices.

In the present context, the term "bulk monomers" is used for the monomers that are added in large amounts to contribute to the basic polymeric structure of the support. Mixtures of different monomers can also be provided in the organic phase.

Examples of useful monomers are also illustrated in the above-discussed U.S. Pat. No. 5,763,548.

Finally, in order to obtain the primary pore structure, the organic phase also comprises a conventional porogen. In a convenient embodiment, the solvent also acts as a porogen. Suitable porogens for use in this context are well known in this field, and the skilled person can easily make a selection among the commercially available products. As the skilled person in this field will realise, the primary pore structure will also be affected by components of the monomer feed.

Any transition metal compound that can participate in a redox cycle with the initiator and dormant polymer chain, but which does not form a direct carbon-metal bond with the polymer chain, is suitable for use in the present method. Thus, in one embodiment, the transition metal present in the catalyst is selected from the group that consists of Cu, Ni, Pd, Ru and Fe. In a preferred embodiment, the transition metal is copper (Cu), such as Cu(I) or Cu(II).

Suitable ligands for use in the present invention include ligands having one or more nitrogen, oxygen, phosphorous and/or sulphur atoms that can co-ordinate to the transition metal through a sigma-bond; ligands that contains two or more carbon atoms that can co-ordinate to the transition metal through a π-bond; and ligands that can co-ordinate to the transition metal through a μ-bond or an η-bond. Accordingly, in one embodiment, the ligand comprises one or more N, O, P, S or C atoms that co-ordinate to the transition metal in the catalyst. In a specific embodiment, the ligand is N,N,N',N', N"-pentamethyldiethylenetriamine. As the skilled person in this field will realise the catalyst will be comprised of a transition metal complexed to a ligand, which complexing will take place more or less immediately after the ligand has been added to the suspension. For this reason, it is preferred to allow a relatively stable suspension to form before adding the ligand. As is well-known in this field, if the reaction is to be scaled-up to a suspension polymerisation reactor, then it is common to adjust the organic droplet size to roughly the size of the desired particles. Thus, in this case, it is preferred to adjust stirrer speed, allow droplet size to stabilise, readjust stirrer speed etc before adding the ligand. Accordingly, in the most advantageous embodiment, step (d) is performed a suitable period of time after step (c), e.g. after about 1 h. In this context, it is also noted that the ligand, which is water-soluble, should in some cases not be present in the aqueous phase before it is contacted with the organic phase, since it will then result in an immediate start of the polymerisation as soon as the two phases are contacted. In an alternative embodiment, the metal catalyst should not be present. As the skilled person in this field will realise, the factors that decides whether or not polymerisation will start immediately is the temperature and the nature of the monomers, hence the conditions are easily adapted from case to case to ensure that the polymerisation is not started until appropriate. This should be avoided, especially in cases where spherical particles are desired.

As mentioned above, the present method is performed under conditions that correspond to any conventional suspension polymerisation (for the basic principles of conventional suspension polymerisation, see e.g. J. R. Benson and D. J. Woo, J. Chromatographic Sci., 1984, 22, 386). Accordingly, the polymerisation can be performed at virtually any temperature below that where a substantial part of the aqueous phase will evaporate or the organic phase will boil. Thus, the temperature may e.g. be ambient temperature, and the reaction time can be any period of time between about 5 minutes and up to several days, such as overnight.

The polymerisation is started according to step (d) by addition of a ligand that co-ordinates to the transition metal, whereby a catalyst is formed. The amount of ligand and transition metal used in the present method are those effective to conduct ATRP, see e.g. U.S. Pat. No. 5,763,548. More specifically, the molar proportion of ligand relative to the transition metal is generally that which is effective to polymerise the selected monomer(s), but can depend on the number of co-ordination sites on the transition metal which the ligand will occupy. The amount of ligand may be selected such that the ratio of (i) co-ordination sites on the transition metal to (ii) co-ordination sites, which the ligand will occupy, is from 0.1:1 to 100:1, such as 0.8:1 to 2:1.

In one embodiment, the removal according to step (e) is performed at basic or acidic conditions. Thus, a change of the pH in the environment can degrade the initiator molecule within the polymeric support. In another embodiment, the removal is performed by degradation of the initiator molecule by applying an external agent, such as heat and/or radiation and/or ultrasound. As the skilled person in this field will realise, the degrading conditions are dependent on the nature and chemical structure of the initiator molecule used. For example, a dendritic polyester macroinitiator can be removed by basic hydrolysis, as illustrated in the examples below. The results can be evaluated by any conventional method, such as Fourier transform infrared spectrometry (FTIR), titration and/or gravimetry. In a specific embodiment of the present method, the removal of the initiator molecule is quantitative. This can be advantageous as a control measure in cases where it is essential to confirm that no initiator molecule has been left in the polymeric support produced, e.g. in various bioprocesses, especially in the pharmaceutical field.

In an especially advantageous embodiment, the present method is used to produce cross-linked porous polymeric supports comprising one functionality or property within primary pores and the same or a different functionality or property within secondary pores. The method then comprises the method as described above and an additional step of selective surface modification of the supports so obtained after step (d) but before step (e). Such surface modification can for example be to introduce functional groups at chemical handles introduced as described above, which functional groups advantageously are ligands useful in chromatography, such as affinity groups, ion exchange groups or the like. Alternatively, the purpose of the surface modification can be to provide the surface of the primary pores with another property, such as hydrophobicity or hydrophilicity. Thus, in one embodiment, the surface available of the support obtained from step (d) is modified using acidic, neutral or basic conditions. The only requirement here is that the conditions used should not degrade the initiator molecule, unless the same modification is desired within both the primary and secondary pores.

The surface of the cavities left after removal of the initiator molecule according to step (e) will be provided with pendant groups resulting from breaking the bond of the ester or amide of the initiator molecule. In the case where the initiator molecule has been removed by hydrolysis, the pendant groups can for example be carboxylic groups. The pendant groups can after step (e) be converted, for example by reduction of carboxyl groups to yield hydroxyl or ether groups, by azidodecarboxylation and subsequent hydrolysis to yield amine groups. Alternatively, the pendant groups can be used to support ligands useful in chromatographic applications, in which case treatment with e.g. $SOCl_2$ is followed by addition of ligand-hydroxyl groups or ligand-amine groups. In another embodiment, the surface of the cavities can be treated as discussed above in order to change its properties, e.g. to make it more hydrophobic or hydrophilic. In a further embodiment, the surface is modified by polymerisation of linear or cross-linked polymer.

Accordingly, the external surface of the supports, the surface of the primary pores and the surface of the pores obtained after removal of the initiator molecule can be modified in any suitable way, depending on the desired use.

As mentioned above, in one embodiment of the present method, the secondary pore size is controlled by using an initiator molecule of a suitable molecular weight. Naturally, the larger initiator molecule used, the larger secondary pores will be obtained. In this context, it is essential to bear in mind that the polymeric supports must be sufficiently robust to not break during step (e).

A second aspect of the present invention is cross-linked porous polymeric support, which exhibits the above-described primary and secondary pore structure. Thus, in one embodiment, the polymeric support has been produced according to the method described above. In a specific embodiment, the polymeric support according to the invention is an essentially spherical particle having a diameter of about 10 μ-250 μ and wherein the absolute surface area is in a range of 150-500 $m^2/g$, such as 300 $m^2/g$. The particles according to the invention are advantageously used as matrices in chromatography, where the large surface area thereof will increase their binding capacity as compared to prior art matrices. Also, the novel multimodal pore structure will contribute to improved mass transport properties.

However, for some isolation purposes columns packed with polymer particles are unsuitable because of the high level of back pressure created. Accordingly, in an alternative embodiment the support according to the invention is a monolith, such as a monolithic plug. The monolith has open passages therethrough, such as a honeycomb-shaped structure, and is desirable for applications wherein a reasonably high rate of fluid flow and a low level of backpressure are required.

In an alternative embodiment, the support according to the invention is a membrane. Such a membrane will include a layer of polymeric support according to the invention fixed onto or attached to a base material according to well-known principles. Membranes are especially advantageous e.g. for large-scale operation, where high flow rates and high capacities are desired.

In an advantageous embodiment, the polymer particle according to the invention comprises one or more kind of chromatography ligands selected from the group affinity ligands, ion exchange ligand, etc bound to the surface of the primary pores and/or the secondary pores. In one embodiment, the surface of the primary and/or secondary pores has been rendered hydrophobic. In an alternative embodiment, the surface of the primary and/or secondary pores has been rendered hydrophilic.

The support according to the invention is accordingly useful for almost any isolation process wherein one or more target substances are separated from other components in a liquid. Thus, the support according to the invention can be used as a chromatographic adsorbent for isolation or separation of biomolecules, such as proteins, nucleic acids, such as plasmids, DNA or RNA, viruses etc, of other organic molecules, such as drug candidates, carbohydrates, or any inorganic compounds or molecules, depending on how they are modified. Similarly, the present method is also useful for purification of a liquid, from which removal of one or more of the above-exemplified target substances is desired. Thus, apart from the purification of a target compound or a liquid, the present invention is also useful for example in methods of combinatorial chemistry. The support according to the invention can also be used as a microcarrier for cell culture and as supports for solid-phase peptide or DNA synthesis.

A third aspect of the present invention is the use of a polymeric support according to the invention as a matrix in chromatography. The principles of different chromatographic separation methods, such as ion exchange chromatography, affinity chromatography, hydrophobic interaction chromatography etc are well known and have been thoroughly described in literature.

DETAILED DESCRIPTION OF THE DRAWINGS

FIG. 1 is a schematic drawing showing in three steps how an organic droplet phase firstly is polymerised by suspension polymerisation into a polymer particle and the porogen is washed out, secondly the primary pore structure is shown with areas of initiator molecule (dark areas), which is subsequently transformed into a polymer particle comprising a secondary pore structure by removal of said initiator.

Figure 2:
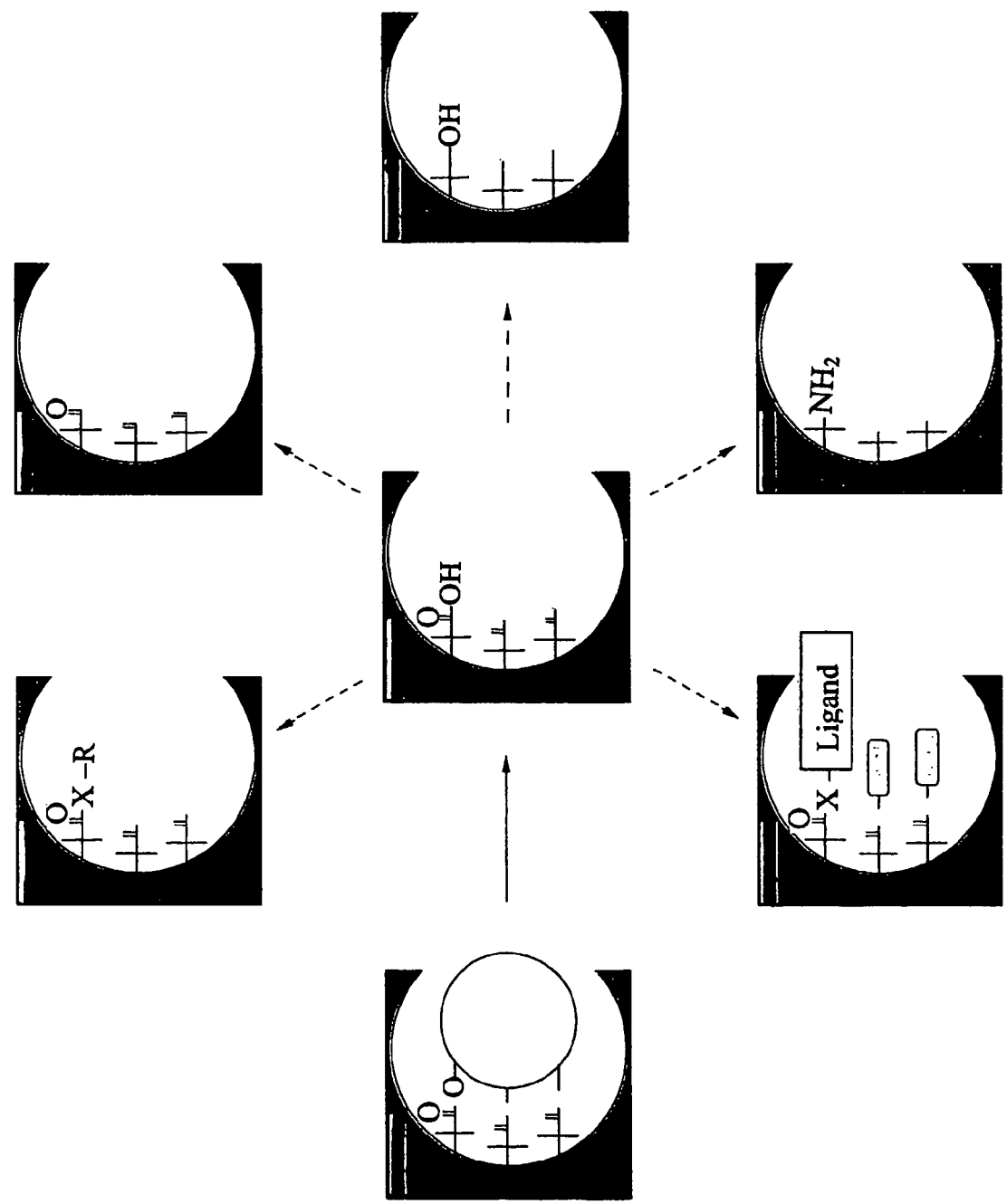
FIG. 2 shows schematically how the secondary pore structure produced according to the present invention can be surface modified.

FIG. 2 shows schematically some examples of possible surface modification of the secondary pore structure produced by removal of the initiator molecules according to the present invention. More specifically, a particle comprising an dendritic polyester (Boltorn®) and divinylbenzene is treated so that differing internal and external functionalities are obtained after hydrolysis. In FIG. 2, the dark surrounding areas are the polymer resins, while the empty circle in the middle, to the left, illustrates a base degradable macroinitiator.

Figure 3:
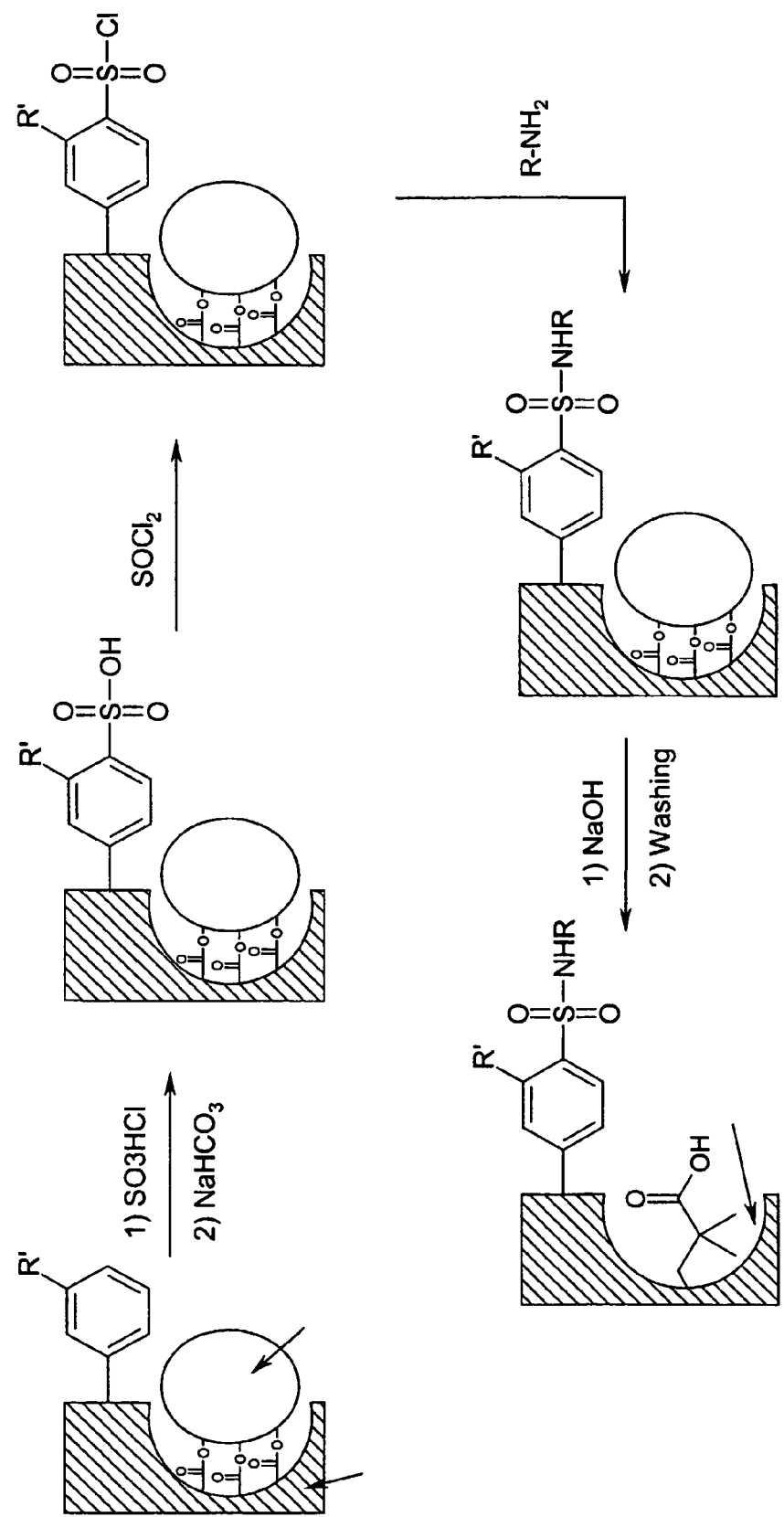
FIG. 3 shows schematically how the primary pore structure produced according to the present invention can be surface modified.

FIG. 3 shows schematically how the primary pore structure produced according to the present invention can be surface modified. More specifically, the cross-hatched sections shows the resin outer and primary pore structure surface, while the open rounded shape illustrates the degradable portion. The last structure, as obtained after treatment with NaOH and washing, shows the secondary pore structure.

Figure 4:
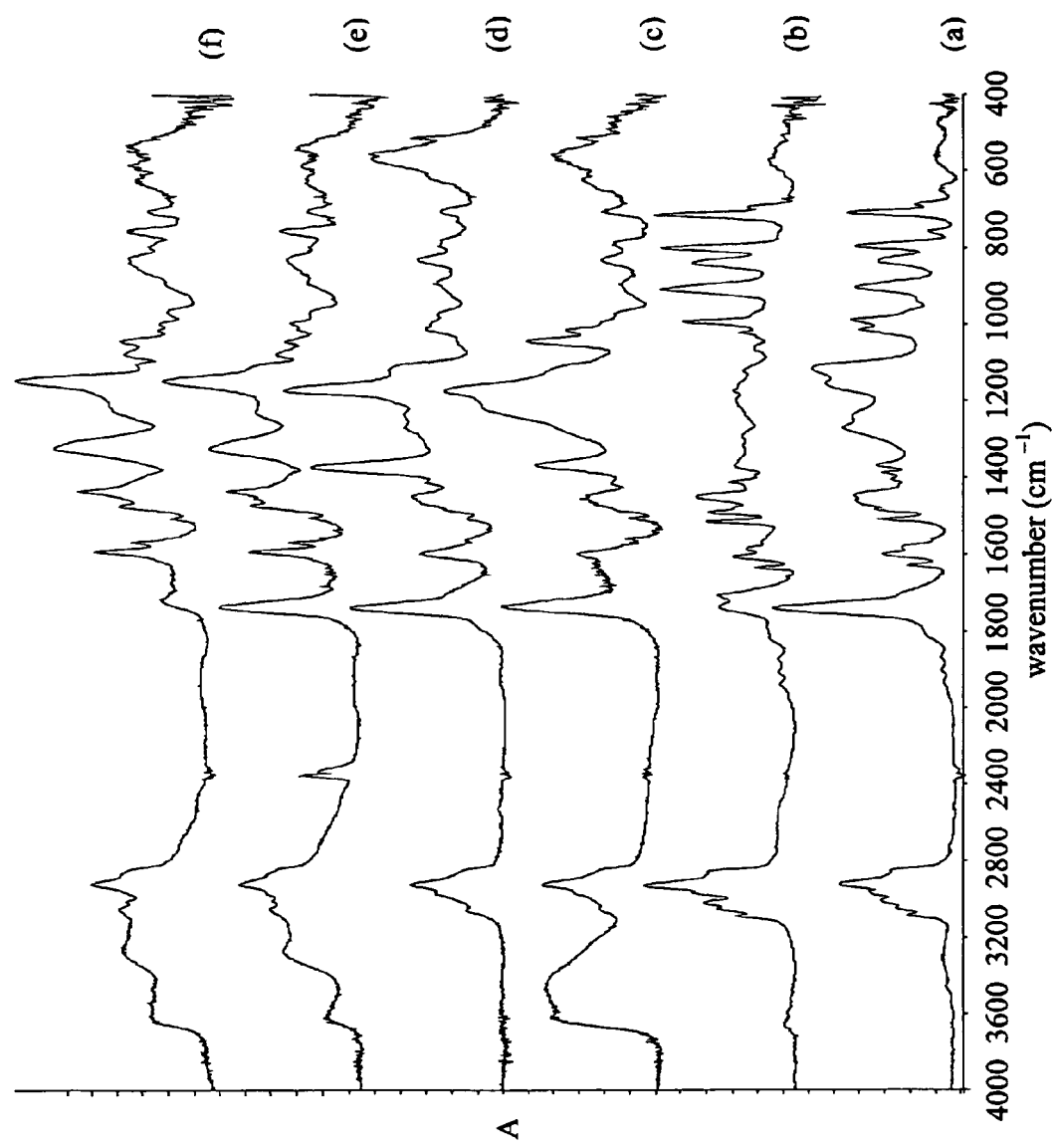
FIG. 4 shows FTIR spectra of (a) beads A4; (b) beads B4; (c) beads E4; (d) beads F4; (e) beads G4; (f) beads H4.

FIG. 4 shows FTIR spectra of (a) beads A4; (b) beads B4; (c) beads E4; (d) beads F4; (e) beads G4; (f) beads H4 as described in detail in the examples below.

Figure 5:
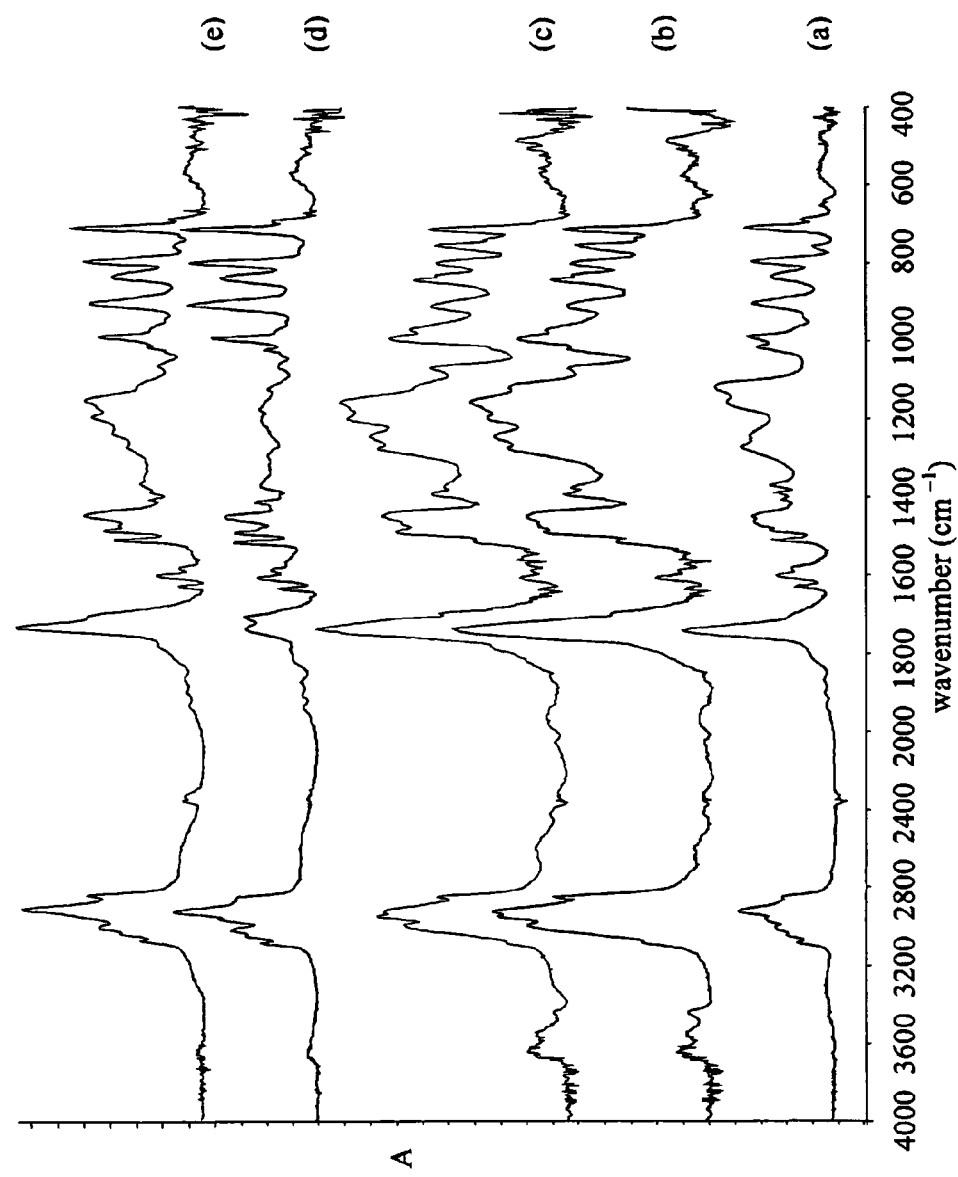
FIG. 5 shows FTIR spectra of (a) beads A4; (b) beads C4; (c) degradation product of C4; (d) beads B4; (e) beads.

FIG. 5 shows FTIR spectra of (a) beads A4; (b) beads C4; (c) degradation product of C4; (d) beads B4; (e) beads D4 as described in detail in the examples below.

Figure 6:
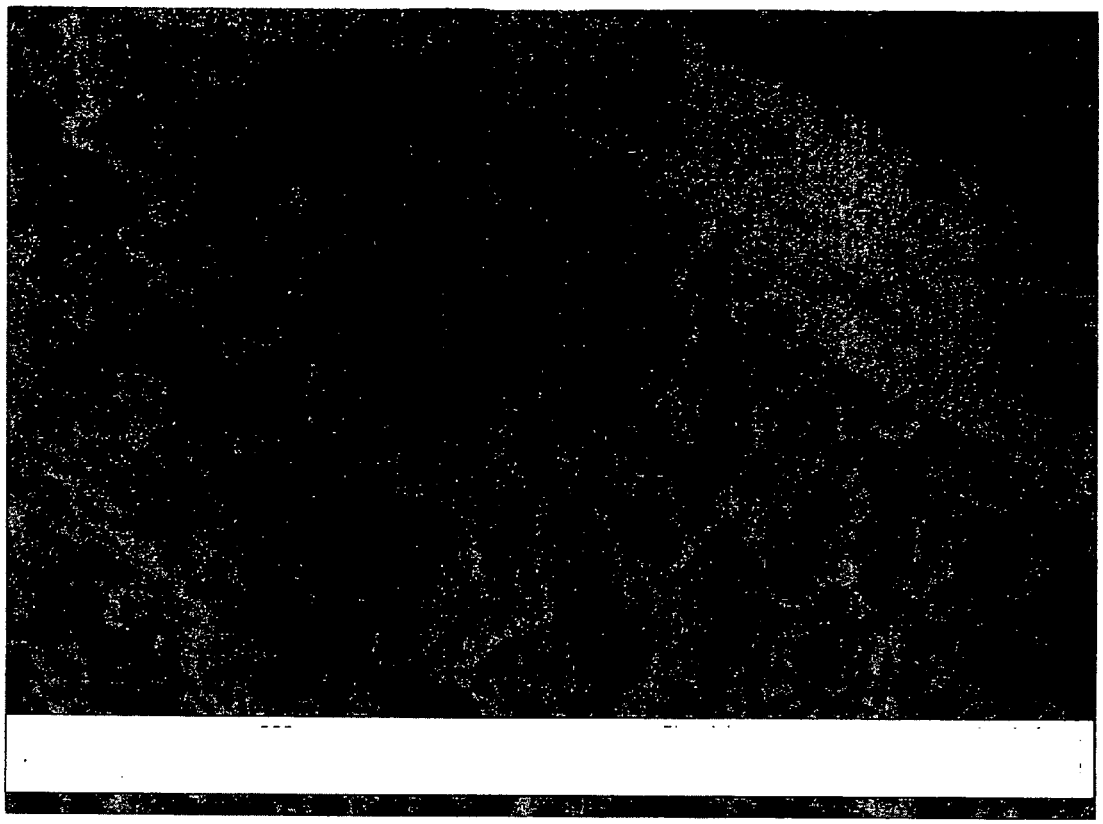
FIG. 6 is a A SEM photograph of a cross-section of beads A1.

FIG. 6 is a A SEM photograph of a cross-section of beads A1 as described in detail in the examples below, see specifically example 2. In FIG. 6, Mag=79,61 KX, 1 cm corresponds to 200 nm, EHT=1.00kV, WD=4 mm, signal A=InLens, Photo no. 3053.

Figure 7:
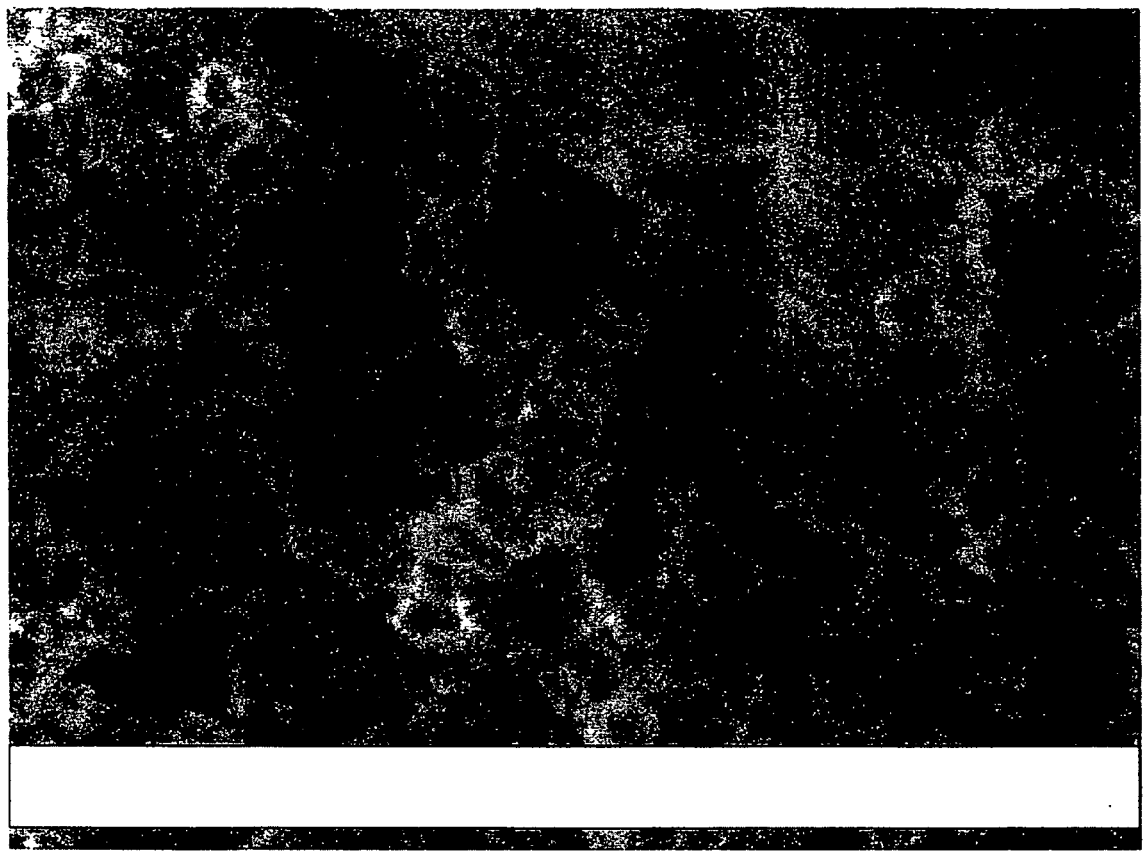
FIG. 7 is a SEM photograph of a cross-section of beads B1.

FIG. 7 is a SEM photograph of a cross-section of beads B1 as described in detail in the examples below. In FIG. 7, Mag=79,61 KX, 1 cm corresponds to 300 nm, EHT=1.00kV, WD=4 mm, signal A=InLens, Photo no. 3054.

Figure 8:
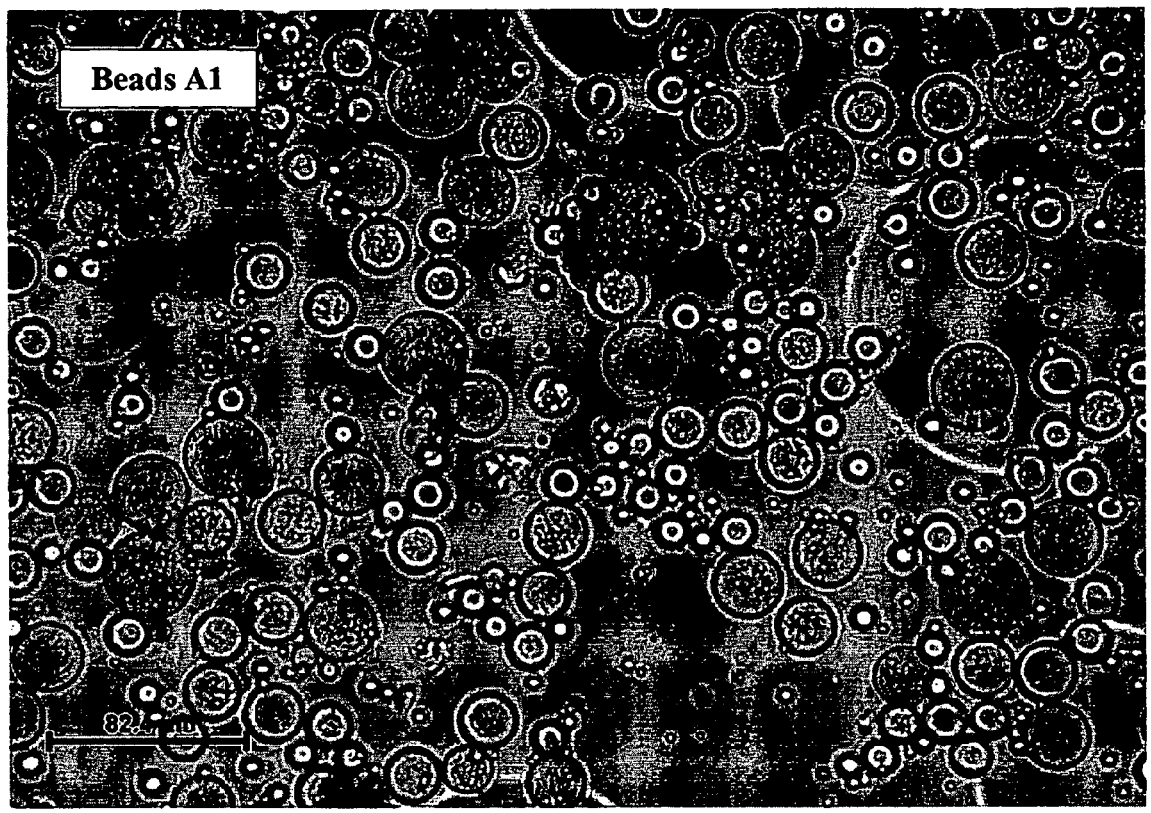
FIG. 8 is a photograph of beads A1 obtained by optical light microscopy.

FIG. 8 is a photograph of beads A1 obtained by optical light microscopy as described in detail in the examples below.

Figure 9:
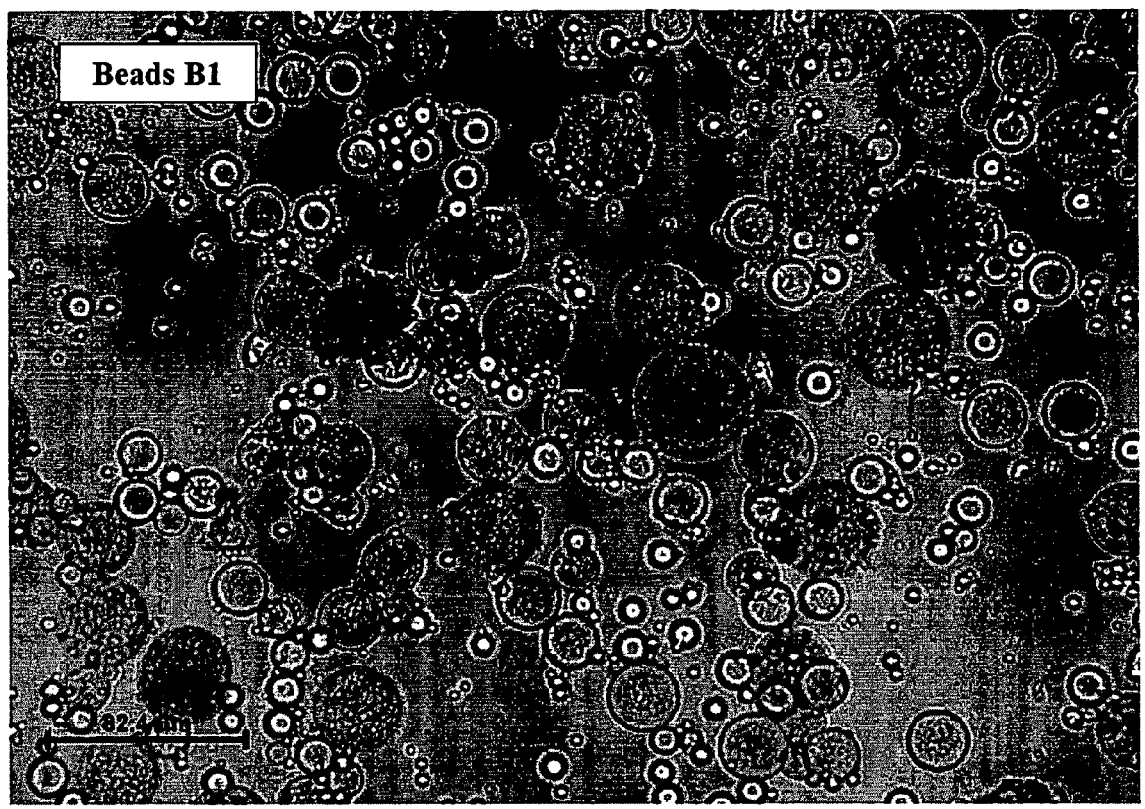
FIG. 9 is a photograph of beads B1 obtained by optical light.

FIG. 9 is a photograph of beads B1 obtained by optical light microscopy as described in detail in the examples below.

FIG. 10 shows Table 1, naming polydivinylbenzene beads initiated by Boltorn®-BiB macroinitiators and mediated by CuCl/PMDETA, see example 2 below.

FIG. 11 shows Table 2, illustrating the hydrolytic degradation of the polyester portion of poly(Boltorn®-BiB-divinylbenzene) beads, see example 3 below.

EXPERIMENTAL PART

Below, the present invention will be described in more detail by way of examples, which however are in no way intended to limit the scope of the present invention as defined by the appended claims. All references given below or elsewhere in the present specification are hereby included herein by reference.

EXAMPLE 1

General Procedure for the Preparation of the Polester Macroinitiators

EXAMPLE 1-1

Synthesis of Boltorn® 2-bromoisobutyryl ester, Boltorn® G2-BiB

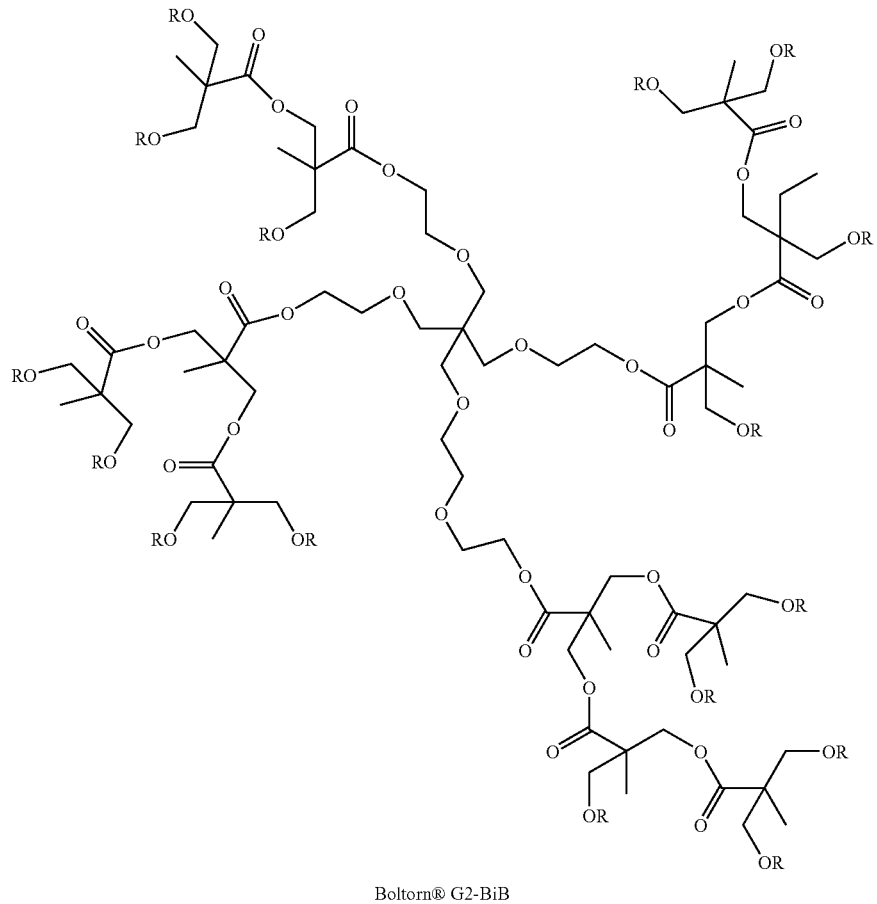

Boltorn® G2-BiB $R = C(O)C(CH_3)_2Br$

Boltorn® G2 (3.50 g; 2 mmol), triethylamine (4.86 g; 48 mmol) and 4-(N,N-dimethylamino)pyridine (1.95 g; 16 mmol) were dissolved in dichloromethane (40 ml) and cooled to 0° C. in an ice bath. 2-Bromoisobutyryl bromide (8.83 g, 38.4 mmol) was dissolved in dichloromethane (10 ml) and added dropwise to the aforementioned solution. The reaction was allowed to proceed at room temperature overnight. The organic phase was extracted first with aq. $NaHCO_3$ (10%) and then with aq. $NH_4Cl$ (10%). The organic phase was dried over $MgSO_4$, clarified with carbon black, and the solvent was removed under vacuum to give the product as pale-yellow oil. Yield 6.2 g (75%). FTIR (film/NaCl) $\nu_{max}$ ($cm^{-1}$) 2980, 1740, 1273, 1162, 766. $^1H$ NMR ($CDCl_3$): $\delta_H$ (ppm) 1.20-1.40 (m, 36H, $CH_{3,Boltorn®}$), 1.91(s, 96H, $CH_{3,BiB}$), 3.30-3.80 (m, 20H, $CH_2$), 4.30-4.40 (m, 56H, $CH_2$) $^{13}C$ NMR ($CDCl_3$): $\delta_C$ (ppm) 18, 31, 47, 55, 66, 171, 172.

EXAMPLE 1-2

Synthesis of Boltorn® 2-bromoisobutyryl ester, Boltorn® G3-BiB

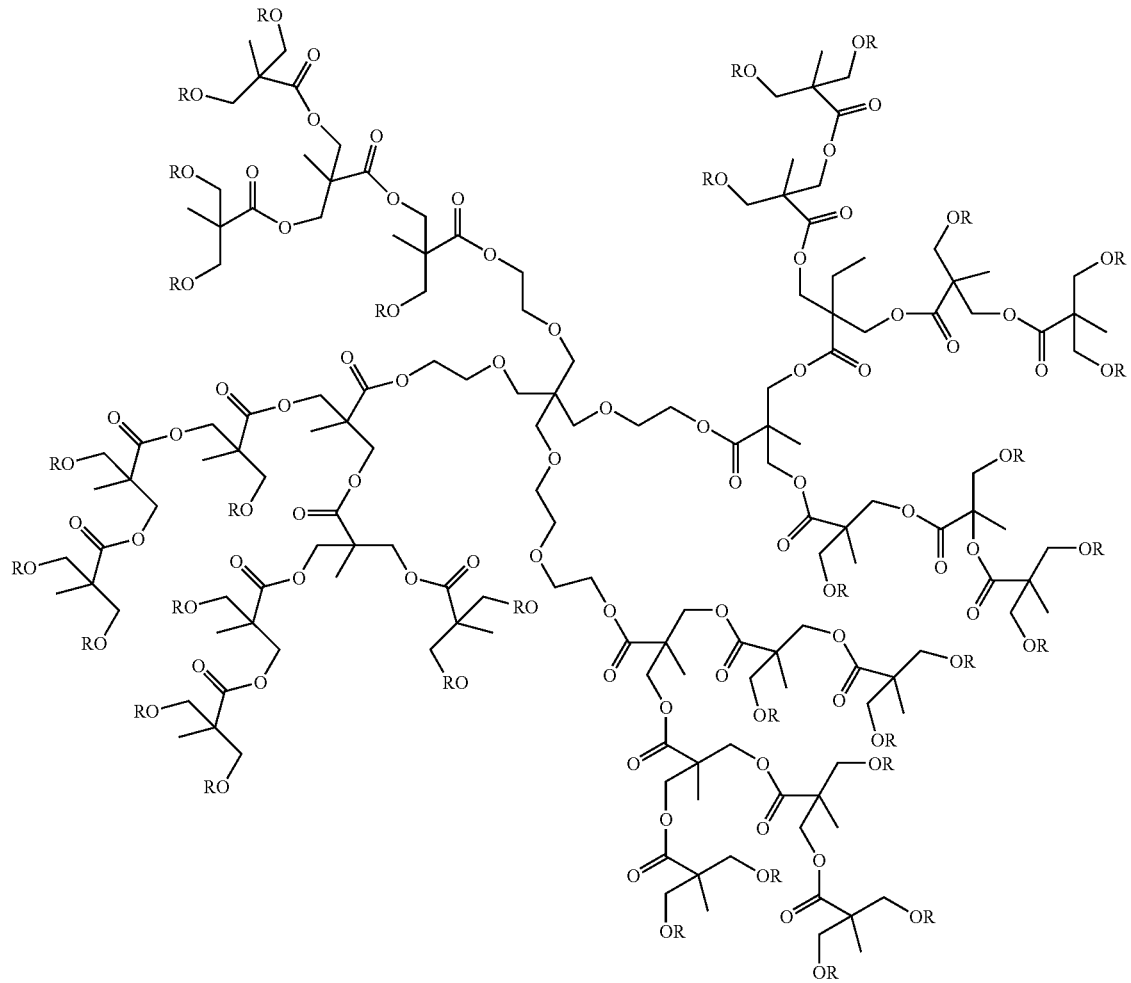

Boltorn® G3-BiB

R = C(O)C(CH$_3$)$_2$Br

Boltorn® G3 (10.0 g; 1.4 mmol) and triethylamine (13.4 g; 67 mmol) were dissolved in tetrahydrofuran (30 ml) and cooled to 0° C. in an ice bath. 2-Bromoisobutyryl bromide (24.5 g, 53 mmol) was dissolved in tetrahydrofuran (24 ml) and added dropwise to the aforementioned solution. The reaction was allowed to proceed at room temperature for 3 hours. The solution was acidified with aq. HCl (37%) and filtered to remove triethylamine salts. The solvent was removed under vacuum and the resulting oil dried by coevaporation with toluene. The oil was dissolved in dichloromethane, the solution clarified with carbon black and filtered. The solvent was evaporated under vacuum. The crude product was dissolved in a minimum amount of dichloromethane and precipitated into n-hexane. This operation was repeated until no impurities were detected by $^1$H NMR. The solvent was then removed under vacuum to give a pale-yellow solid. Yield 16.7 g (72%). FTIR (film/NaCl) $v_{max}$ (cm$^{-1}$) 2980, 1740, 1273, 1162, 766. $^1$H NMR (CDCl$_3$): $\delta_H$ (ppm) 1.20-1.40 (m, 84H, CH$_{3,Boltorn®}$), 1.91(s, 192H, CH$_{3,BiB}$), 3.30-3.80 (m, 20H, CH$_2$), 4.30-4.40 (m, 120H, CH$_2$).$^{13}$C NMR (CDCl$_3$): $\delta_C$ (ppm) 18, 31, 47, 55, 66, 171, 172.

EXAMPLE 1-3
Synthesis of Boltorn® 2-bromoisobutyryl ester, Boltorn® G4BiB
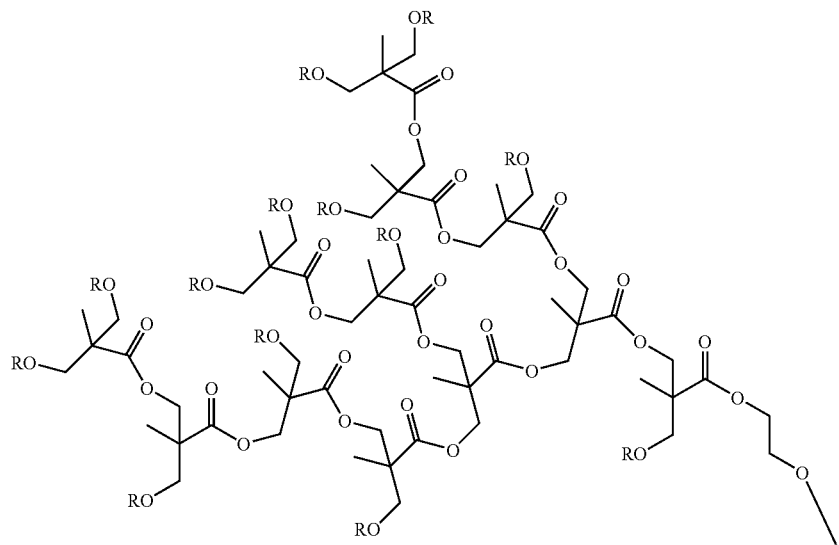
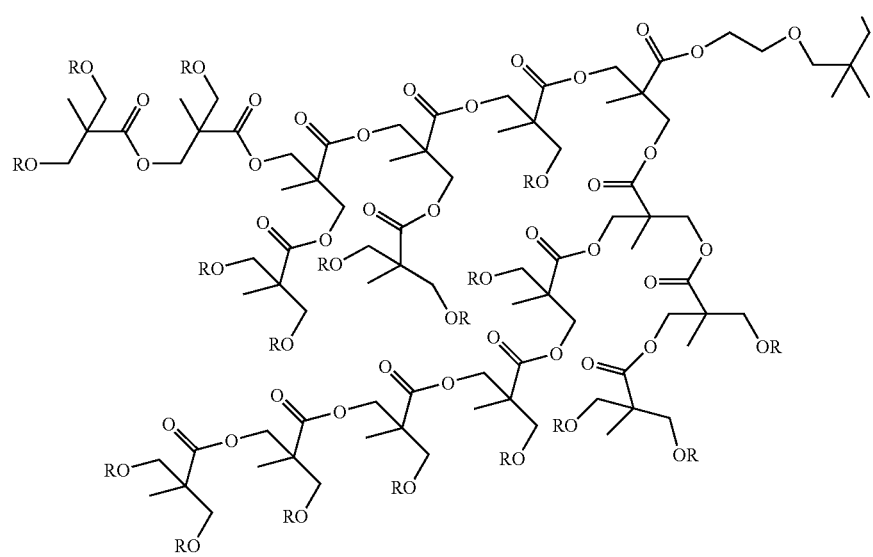

-continued

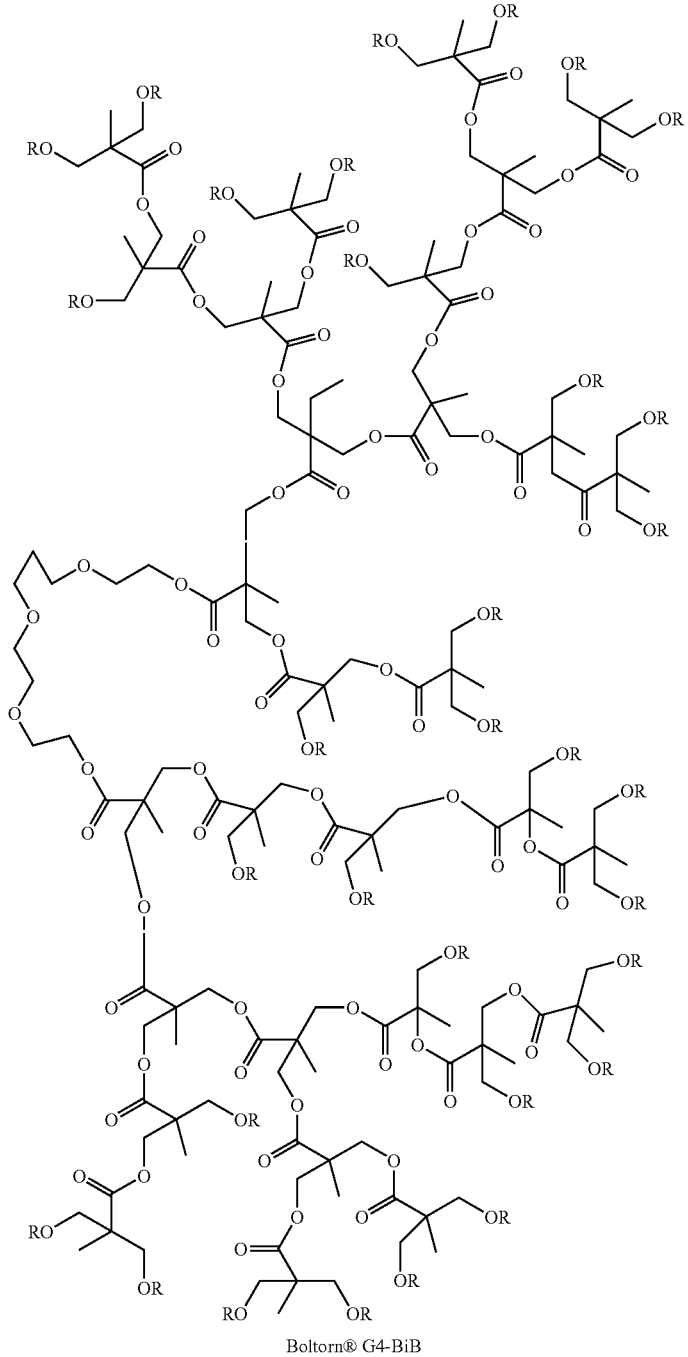

Boltorn® G4-BiB

R = C(O)C(CH$_3$)$_2$Br

Boltorn® G4 (10.4 g; 0.68 mmol) and triethylamine (13.2 g; 66 mmol) were dissolved in dichloromethane (30 ml) and cooled to 0° C. in an ice bath. 2-Bromoisobutyryl bromide (24.0 g, 52 mmol) was dissolved in dichloromethane (20 ml) and added dropwise to the aforementioned solution. The reaction was allowed to proceed at room temperature for 3 hours. Dichloromethane was added to the reaction and the organic phase was extracted first with aq. HCl (2M) and then with aq. NaHCO$_3$(10%). The organic phase was dried over MgSO$_4$, clarified with carbon black, and the solvent was removed under vacuum. The resulting oil was dissolved in a minimum amount of dichloromethane and precipitated into n-hexane. This operation was repeated until no impurities were detected by $^1$H NMR. The solvent was then removed under vacuum to give a pale-yellow solid. Yield 15.9 g (69%). FTIR (film/NaCl) $v_{max}$ (cm$^{-1}$) 2980, 1740, 1273, 1162, 766. $^1$H NMR (CDCl$_3$): $\delta_H$ (ppm) 1.20-1.40 (m, 180H, CH$_{3,Boltorn®}$), 1.91 (s, 384H, CH$_{3,BiB}$), 3.30-3.80 (m, 20H, CH$_2$), 4.30-4.40 (m, 248H, CH$_2$). $^{13}$C NMR (CDCl$_3$): $\delta_C$ (ppm) 18, 31, 47, 55, 66, 171, 172.

EXAMPLE 2

General Procedure for the Preparation of Polydivinylbenzene Beads Initiated by Boltorn®-BiB Macroinitiators and Mediated by CuCl/PMDETA (FIG. 10, Table 1)

Divinylbenzene and Boltorn®-BiB macroinitiator were dissolved in toluene in a screw-top test tube. Ethyl-1-hexanol was added to the solution. The aqueous phase was made-up by combining an aqueous solution of Mowiol 40-88 with CuCl and aq. HCl. The aqueous phase was added to the vial and a suspension was created by shaking the vial. N,N,N',N',N"-pentamethylthriethylenediamine was added and the vial was shaken vigorously. The suspension was maintained for 24 hours at room temperature by rotating the vial at 60 rpm perpendicular to a parallel axis. The content of the vial was poured into boiling water. The beads were removed by filtration and washed with boiling water, ethanol and acetone. The beads were dried overnight under vacuum at 75° C.

EXAMPLE 2-1

Preparation of Polydivinylbenzene Beads Initiated by Boltorn® G3-BiB and Mediated by CuCl/PMDETA (Beads A4)

Divinylbenzene (4.90 ml; 4.48 g; 34.4 mmol) and Boltorn® G3-BiB (2.11 g; 0.25 mmol) were dissolved in toluene (2.10 ml) in a 50 ml screw-top glass test tube. 2-Ethyl-1-hexanol (4.90 ml) was added to the solution. The aqueous phase was made-up by combining an aqueous solution of Mowiol 40-88 (5%) (36 ml) with CuCl (0.24 g, 2.42 mmol) and aq. HCl (37%) (0.21 ml). The aqueous phase was added to the vial and a suspension was created by shaking the vial. N,N,N',N',N"-pentamethylthriethylenediamine (1.00 ml, 0.83 g, 4.79 mmol) was added and the vial was shaken vigorously. The suspension was maintained for 24 hours at room temperature by rotating the vial at 60 rpm perpendicular to a parallel axis. The content of the vial was poured into boiling water (1000 ml). The beads were removed by filtration and washed with boiling water (8000 ml), ethanol (500 ml) and acetone (200 ml). The beads were dried overnight under vacuum at 75° C. Yield 5.42 g (82%). FTIR (KBr) $v_{max}$ (cm$^{-1}$) 3004 ((C—H)$_{Ar}$), 2965 ((C—H)$_{CH3}$), 2926 ((C—H)$_{CH2}$), 1740 (C=O), 1628 (C=C)$_{vinyl}$), 1596 (Ar-breathing), 1273-1162 (C—O—C) (FIG. 4).

A SEM photograph of a cross-section of beads A1 is given as example in FIG. 6.

A microphotograph of beads A1 obtained by optical light microscopy is given as example in FIG. 8. Spherical beads being 10-60 μm i.d. were obtained.

EXAMPLE 3

General Procedure for the Hydrolytic Degradation of the Polyester Portion of Poly(Boltorn®-BiB-Divinylbenzene) Beads (FIG. 11, Table 2)

The poly(Boltorn®-BiB-divinylbenzene) beads were shaken in ethanolic NaOH (10%) at 50° C. for 24 hours. The obtained beads were removed by filtration and washed successively with ethanolic NaOH (10%), water, ethanol, ethanolic HCl (2 M), ethanol and acetone, and dried under vacuum at 75° C.

EXAMPLE 3-1

Hydrolytic Degradation of Beads A4 (Beads B4)

The poly(Boltorn®-BiB-divinylbenzene) beads A4 (0.1422 g) were shaken in ethanolic NaOH (10%) (20 ml) at 50° C. for 24 hours. The obtained beads were removed by filtration and washed with ethanolic NaOH (10%) (100 ml), water (1000 ml), ethanol (500 ml), ethanolic HCl (2 M) (500 ml), ethanol (500 ml) and acetone (200 ml) and dried under vacuum at 75° C. Yield 0.1033 g. FTIR (KBr) $v_{max}$ (cm$^{-1}$) 3030 and 3004 ((C—H)$_{Ar}$), 2926 ((C—H)$_{CH2}$), 1720-1700 (C=O), 1628 (C=C)$_{vinyl}$), 1596 (Ar-breathing) (FIG. 4). A SEM photograph of a cross-section of beads B1 is given as example in FIG. 7. A microphotograph of beads B1 obtained by optical light microscopy is given as example in FIG. 9. Spherical beads being 10-60 μm i.d. were obtained.

EXAMPLE 4

ATRP of MMA

Beads, MMA, transition metal, ligand and solvent were combined and degassed with a $N_2$ stream for 15 minutes. The reaction vessel was sealed and heated to 60° C. for 48 hours. The beads were removed by filtration and washed with dichloromethane, ethanolic HCl (2M), ethanol and acetone. The beads were dried under vacuum at 75° C. for 24 hours.

EXAMPLE 4-1

ATRP of MMA Using Beads A4 (Beads C4)

Beads A4 (0.1003 g), MMA (1.225 g, 12.2 mmol), CuCl (0.0118 g, 0.119 mmol), 2,2'-bipyridine (0.0380 g, 0.243 mmol) and anisole (1.308 ml) were combined and degassed with a $N_2$ stream for 15 minutes. The reaction vessel was sealed and heated to 60° C. for 48 hours. The beads were removed by filtration and washed with dichloromethane (200 ml), ethanolic HCl (2M) (200 ml), ethanol (100 ml) and acetone (200 ml). The beads were dried under vacuum at 75° C. for 24 hours. Yield 0.2300 g; 12.9 mmol MMA units per gram starting material. A FTIR spectrum is shown in FIG. 5.

EXAMPLE 4-2

ATRP of MMA Using Beads B4 (Beads D4)

Beads B4 (0.0408 g), MMA (0.668 g, 6.85 mmol), CuCl (0.0076 g, 0.077 mmol), 2,2'-bipyridine (0.0207 g, 0.132 mmol) and anisole (0.735 ml) were combined and degassed with a $N_2$ stream for 15 minutes. The reaction vessel was sealed and heated to 60° C. for 48 hours. The beads were removed by filtration and washed with dichloromethane (200 ml), ethanolic HCl (2M) (200 ml), ethanol (100 ml) and acetone (200 ml). The beads were dried under vacuum at 75° C. for 24 hours. Yield 0.0523 g; 2.82 mmol MMA units per gram starting material. A FTIR spectrum is shown in FIG. 5.

EXAMPLE 5

Sulphonation Using Beads A4 (Beads E4)

Beads A4 (5.00 g) were slurred in chloroform (25 ml). Chlorosulphonic acid (23 ml, 40.7 g, 350 mmol) was added in several portions to the reaction mixture. The reaction was shaken at room temperature overnight. The beads were filtered and washed with dichloromethane (500 ml) and acetone (200 ml). The beads were shaken overnight in aq. Na—HCO$_3$ (10%) (50 ml). The beads were removed by filtration and washed with aq. Na—HCO$_3$ (10%) (200 ml), aq. HCl (2M) (200 ml), ethanol (200 ml), acetone (200 ml) and ether (100 ml) and dried under vacuum at 75° C. overnight to give orange beads. Yield 5.99 g. FTIR (KBr) $v_{max}$ (cm$^{-1}$) 3463 (S—OH), 3030 ((C—H)$_{Ar}$) 2965 ((C—H)$_{CH\ 3}$), 2926 ((C—H)$_{CH2}$), 1740 (C=O), 1596 (Ar-breathing), 1211 and 1177 (O=S=O) (FIG. 4).

EXAMPLE 6

Chlorination of Beads E4 (Beads F4)

Thionyl chloride (20 ml, 274 mmol) was added slowly to the dried beads (3.97 g) under a N$_2$ stream and the flask was sealed and shaken at 60° C. for 48 hours. The beads were filtered and washed with chloroform (300 ml) and dried under vacuum at 75° C. over one day to give brown/purple beads. Yield 3.94 g. FTIR (KBr) $v_{max}$ (cm$^{-1}$) 3030 ((C—H)$_{Ar}$) 2965 ((C—H)$_{CH3}$), 2926 ((C—H)$_{CH2}$), 1740 (C=O), 1596 (Ar-breathing), 1371 and 1172 (O=S=O) (FIG. 4).

EXAMPLE 7

Synthesis of 2-(aminomethyl)pyridine sulphonamide Derivative from Beads F4 (Beads G4)

Beads F4 (0.4876 g) were slurred in dichloromethane (5 ml) and cooled to 0° C. 2-(aminomethyl)pyridine (1.88 g; 17.4 mmol) was dissolved in dichloromethane (5 ml) and cooled to 0° C. The above solution was slowly added to the beads slurry under constant shaking. The reaction was heated to 50° C. and shaken for 24 hours. The beads were removed by filtration and washed with ethanol (99.5%) (100 ml), water (100 ml), ethanol (99.5%) (100 ml), acetone (100 ml) and dichloromethane (100 ml). Yield: 0.4956 g. FTIR (KBr) $v_{max}$ (cm$^{-1}$) 3280 (N—H), 3030 and 3010 ((C—H)$_{Ar}$) 2965 ((C—H)$_{CH3}$), 2926 ((C—H)$_{CH2}$), 1740 (C=O), 1596 (Ar-breathing), 1327 and 1172 (O=S=O) (FIG. 4).

EXAMPLE 8

Hydrolytic Degradation of Beads G4 (Beads H4)

Beads G4 (0.1565 g) were shaken in ethanolic NaOH (10%) (20 ml) at 50° C. for 24 hours. The obtained beads were removed by filtration and washed with ethanolic NaOH (10%) (100 ml), water (1 L), ethanol (500 ml), ethanolic HCl (2 M) (500 ml), ethanol (500 ml) and acetone (200 ml) and dried under vacuum at 75° C. Yield 0.1275 g. FTIR (KBr) $v_{max}$ (cm$^{-1}$) 3280 (N—H), 3030 and 3010 ((C—H)$_{Ar}$) 2965 ((C—H)$_{CH3}$), 2926 ((C—H)$_{CH2}$), 2800-2400 (O—H)$_{acid\ H-bonded}$, 1700 (C=O), 1596 (Ar-breathing), 1327 and 1172 (O=S=O) (FIG. 4).

What is claimed is:
1. A method of producing a cross-linked polymeric support having a multimodal pore structure, comprising the steps of:
  (a) providing a degradable initiator molecule;
  (b) providing an organic phase, which comprises said initiator molecule, one or more radically polymerisable monomers and a porogen in a solvent, and an aqueous phase, which comprises a transition metal catalyst;
  (c) forming a suspension of the organic phase and the aqueous phase;
  (d) starting a suspension polymerisation of the organic phase in the aqueous phase by adding a ligand, which co-ordinates to the transition metal in the aqueous phase via at least one atom, to produce a cross-linked polymeric support having a primary pore structure and comprising initiator molecule; and
  (e) subjecting the support obtained from step (d) to degrading conditions to at least partially remove the initiator molecule from within the support to produce a cross-linked polymeric support having a secondary pore structure in addition to the primary pore structure.

2. The method of claim 1, wherein the initiator molecule is a macroinitiator.

3. The method of claim 1, wherein step (a) comprises to react a compound that comprises at least one hydroxy group, primary amine group or secondary amine group with an alfa-haloacyl halide.

4. The method of claim 3, wherein a hydroxy-functional dendritic polyester is reacted with the alfa-haloacyl halide.

5. The method of claim 3, wherein an amino-functional dendritic polyamide is reacted with the alfa-haloacyl halide.

6. The method of claim 1, wherein in step (d), the organic phase comprises up to about 50% of the initiator molecule, calculated as weight/weight monomer.

7. The method of claim 1, wherein the monomers are synthetic mono and/or multifunctional monomers, such as styrene and/or divinyl benzene.

8. The method of claim 1, wherein the transition metal is selected from the group consisting of Cu, Ni, Pd, Ru and Fe.

9. The method of claim 1, wherein the ligand comprises one or more N, O, P, S or C atoms that co-ordinated to the transition metal to form a catalyst system.

10. The method of claim 1, wherein the removal according to step (e) is performed under basic or acidic conditions.

11. The method of claim 1, wherein the removal according to step (e) is performed by applying an external agent.

12. The method of claim 1, wherein a cross-linked polymeric support is produced comprising one functionality within a primary pore structure and one functionality within a secondary pore structure and an additional step of selective surface modification of the supports so obtained after step (d) but before step (e).

13. The method of claim 12, wherein the surface of the support obtained from step (d) is modified using conditions that have no essential impact on the initiator molecule present in the support.

14. The method of claim 1, wherein the secondary pore size is controlled by the molecular weight of the initiator molecule.

15. The method of claim 1, wherein a cross-linked porous polymeric support has been produced.

16. The polymeric support of claim 15, comprising one or more essentially spherical particles having a diameter of about 10 μm and 250 μm, wherein the specific surface area is in a range of 150-300 m$^2$/g.

17. The polymeric support of claim 15, which is a monolith.

18. The polymeric support of claim 15, comprising functional groups, such as chromatography ligands, coupled to the surface of the primary pores and/or the secondary pores.

19. The use of the polymeric support of claim 15 as a matrix in chromatography.

* * * * *